United States Patent [19]
Isomi et al.

[11] Patent Number: 5,401,616
[45] Date of Patent: Mar. 28, 1995

[54] PATTERNING METHOD EMPLOYING LASER

[75] Inventors: Akira Isomi, Hirakata; Masato Hagino, Osaka, both of Japan

[73] Assignee: Matsushita Electric Industrial Co., Ltd., Osaka, Japan

[21] Appl. No.: 121,194

[22] Filed: Sep. 15, 1993

[30] Foreign Application Priority Data

Sep. 21, 1992 [JP] Japan ................................ 4-251017

[51] Int. Cl.⁶ .............................................. G03F 9/00
[52] U.S. Cl. ........................................ 430/258; 430/7; 430/262; 430/272; 430/321; 430/945
[58] Field of Search ............... 430/257, 258, 272, 159, 430/7, 20, 945, 262, 254, 321

[56] References Cited

U.S. PATENT DOCUMENTS

| | | | |
|---|---|---|---|
| 3,721,557 | 3/1973 | Inoue | 430/257 |
| 3,904,411 | 9/1975 | Erickson et al. | 430/257 |
| 4,716,270 | 12/1987 | Gnanamuthu et al. | 219/121 LM |
| 5,104,773 | 4/1992 | Ahne et al. | 430/945 |
| 5,227,276 | 7/1993 | Roeschert et al. | 430/258 |
| 5,290,665 | 3/1994 | Kii et al. | 430/272 |

*Primary Examiner*—Charles L. Bowers, Jr.
*Assistant Examiner*—John S. Chu
*Attorney, Agent, or Firm*—Wenderoth, Lind & Ponack

[57] ABSTRACT

A patterning method includes the steps of irradiating an excimer laser beam to a material layer so as to form a pattern on the material layer; and transferring onto a substrate, the material layer formed with the pattern; and irradiating the excimer laser beam to the material layer transferred onto the substrate so as to form a further pattern on the material layer.

6 Claims, 3 Drawing Sheets

PATTERNING METHOD EMPLOYING LASER

BACKGROUND OF THE INVENTION

The present invention relates to a patterning method for use in production of a color filter, etc. for a liquid crystal display.

In a known method of forming a pattern on a color filter for a liquid crystal display, a pattern is formed by photolithography on a light shielding film of Cr or the like formed on a glass substrate so as to produce a black matrix and then, colored patterns of red, green and blue are formed on the substrate by dying, pigment dispersion, printing, etc.

In dying, after photosensitive water-soluble resist such as gelatin has been coated on the glass substrate, a predetermined pattern is obtained by exposure and development. In addition, by dying and fixing, colored patterns are obtained. By repeating this process three times, colored layers of red, green and blue are formed.

In pigment dispersion, colored photoresist in which pigment is dispersed is coated on the glass substrate and then, a predetermined pattern is obtained by exposure and development. By repeating this process three times, colored patterns of red, green and blue are formed.

Such methods as litho offset printing and intaglio offset printing are used for printing. In litho offset printing, ink on a pattern portion of a print is transferred onto an elastic rubber member and then, is printed on the substrate. On the other hand, in intaglio offset printing, ink is filled on the pattern portion and unnecessary ink is scraped from the pattern portion by a scraper. Subsequently, ink is transferred onto an elastic rubber member and then, is printed on the substrate. In any one of the printing methods, colored inks of red, green and blue are sequentially printed on the same glass substrate so as to form colored patterns, respectively.

In such conventional dying and pigment dispersion employing photolithography, the processes are complicated and production apparatuses are also expensive, thereby resulting in an increase in the production cost of the color filter. Meanwhile, in known printing, since the pattern has an arcuate sectional shape in which film thickness at it central portion is different from that of its opposite end portions, the pattern is not flat and thus, nonuniformity in film thickness is likely to take place.

SUMMARY OF THE INVENTION

Accordingly, an essential object of the present invention is to provide a patterning method in which a color filter can be produced highly accurately at low cost.

In order to accomplish this object of the present invention, a patterning method according to the present invention comprises the steps of: irradiating an excimer laser beam to a material layer for patterning so as to form a pattern on the material layer; and transferring onto a substrate, the material layer formed with the pattern.

In the above described patterning method, since the excimer laser beam is irradiated to the material layer so as to form the pattern on the material layer through laser ablation, the pattern can be formed on the material layer highly accurately without the need for performing wet development.

Meanwhile, since the pattern formed on the material layer can be inspected prior to transfer, waste of the substrate is avoided. Furthermore, since the material layer is not required to be photosensitive, a wide range of materials having excellent heat resistance and solvent-resistance properties can be used for the material layer.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout the accompanying drawings.

DETAILED DESCRIPTION OF THE INVENTION

Figure 1A:
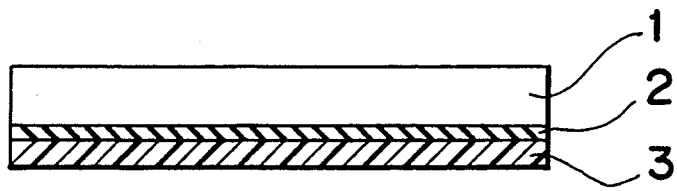
FIGS. 1 (*a*) to 1(*e*) are schematic views showing steps of a patterning method according to a first embodiment of the present invention.

Referring now to the drawings, there are shown in FIGS. 1(*a*) to 1(*e*), steps of a patterning method according to a first embodiment of the present invention. In FIG. 1(*a*), a peel layer 2 and a red color filter 3 acting as a patterning material layer are formed on a support member 1. The support member 1 is formed by a polyester film, while the peel layer 2 is made of silicone rubber or silicone resin for peeling. The patterning material layer in which red, green and blue organic pigments are dispersed in resin such as epoxy resin, acrylic resin, etc. can be formed by spin coating, roll coating, spray coating or the like.

In FIG. 1(*b*), an excimer laser beam 9 is irradiated to the red color filter 3 so as to form a pattern. An excimer laser is of the discharge excitation type using a mixed gas of rare gas Xe and halogen gas $Cl_2$ and can have an oscillation wavelength of 308 nm or an oscillation wavelength of 248 nm of Kr and $F_2$. Irradiation of the laser beam is performed by a mask imaging method. When the XeCl excimer laser beam 9 having an energy density of 1.2 $J/cm^2$ per pulse is irradiated to the red color filter 3 having a thickness of 2 $\mu m$, portions of the red color filter 3, which are subjected to irradiation of the laser beam, can be removed through ablation by irradiation of four pulses and thus, a red color filter pattern 6 is obtained.

FIGS. 1(*c*) and 1(*d*) show a step in which the red color filter pattern 6 is transferred onto a substrate through an adhesive layer 12. A glass substrate 10 formed with a black matrix 11 is used as the substrate. The black matrix 11 is obtained by patterning light shielding material such as Cr by photolithography or forming a light shielding pattern in a pigment dispersion method by using resin. The black matrix 11 may also be obtained by a method in, which after a light shielding film having carbon dispersed in resin has been formed on a glass substrate, a pattern is formed by irradiating an excimer laser beam to the light shielding film. The adhesive layer 12 should have an adhesive property for peeling the red color filter pattern 6 from the peel layer 2. Furthermore, after transfer, the adhesive layer 12 desirably has a sufficient adhesive property, heat resistance and resistance against solvent. In this embodiment, ultraviolet-curing epoxy resin is employed as the adhesive layer 12. After the adhesive layer 12 has been coated on the glass substrate 10, a proper quantity of ultraviolet ray is irradiated to the adhesive layer 12 so as to impart an adhesive property to the adhesive layer 12 and then, transfer of the red color filter pattern 6 is performed.

Figure 1B:
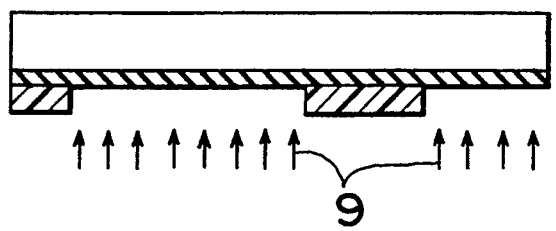
Figure 1C:
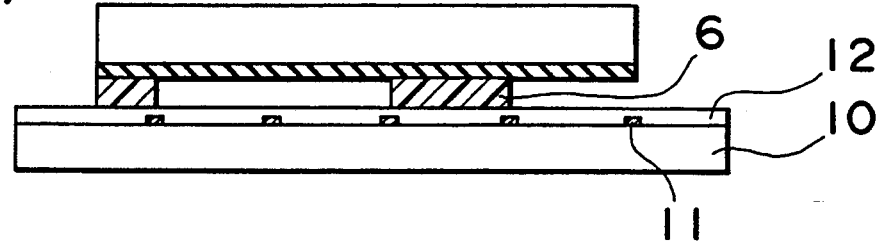
Figure 1D:
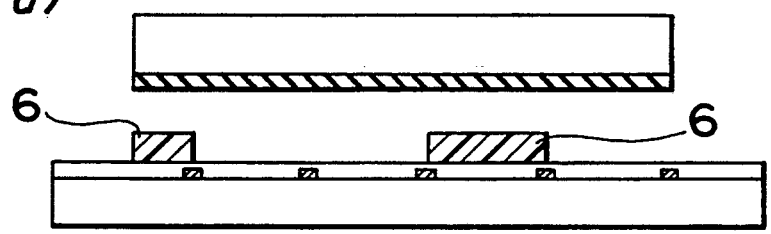
Figure 1E:
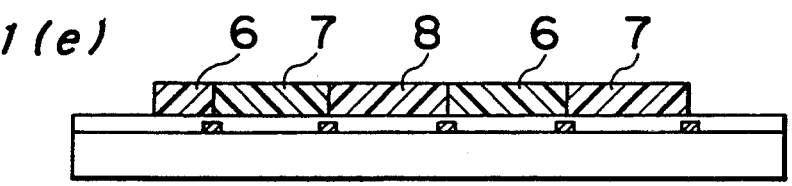

In FIG. 1(e), a green color filter and a blue color filter are formed in the same manner as the steps of FIGS. 1(a) and 1(b) and then, a green color filter pattern 7 and a blue color filter pattern 8 are transferred onto the glass substrate 10 as in the step of FIG. 1(d). Thereafter, an ultraviolet ray is irradiated to the glass substrate 10 so as to cure the adhesive layer 12. As a result, a color filter for liquid crystal is obtained.

Meanwhile, in FIGS. 1(c), 1(d) and 1(e), the color filter pattern is transferred onto the glass substrate 10 through the adhesive layer 12. However, by thermal contact bonding, the color filter pattern may also be transferred directly onto the glass substrate 10 formed with the black matrix 11. Namely, after the color filter pattern formed as in the steps of FIGS. 1(a) and 1(b) has been contact bonded to the glass substrate 10 and then, heated, the support member 1 formed with the peel layer 2 is peeled from the color filter pattern. As a result, the color filter pattern is transferred onto the glass substrate 10. By transferring the remaining color filter patterns of other colors onto the glass substrate 10 successively, a color filter for a liquid crystal display is obtained.

When the color filter for liquid crystal produced by the patterning method according to the first embodiment of the present invention is used for a liquid crystal display, the liquid crystal display has good display quality and reliability of the color filter is also excellent.

Figure 2A:
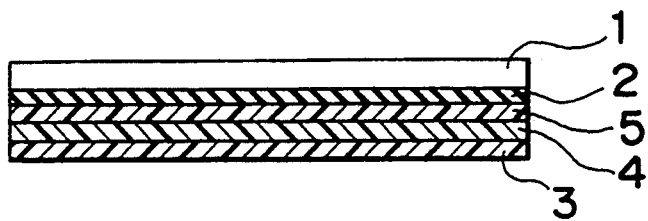
FIGS. 2(*a*) to 2(*g*) are schematic views showing steps of a patterning method according to a second embodiment of the present invention.
Figure 2B:
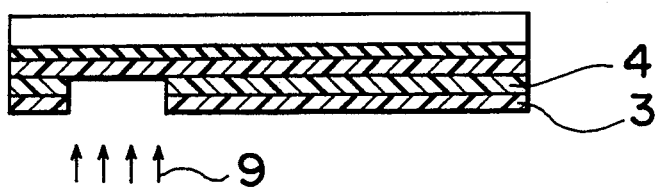
Figure 2C:
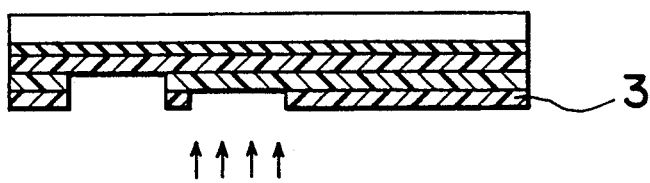

FIGS. 2(a) to 2(g) show steps of a patterning method according to a second embodiment of the present invention. In FIG. 2(a), the peel layer 2, the red color filter 3, a green color filter 4 and a blue color filter 5 are piled on the support member 1. In FIG. 2(b), by irradiating the excimer laser beam 9 to the red color filter 3 and the green color filter 4, a pattern is formed on the red color filter 3 and the green color filter 4. Meanwhile, in FIG. 2(c), by irradiating the excimer laser beam 9 to only the red color filter 3, a pattern is formed on only the red color filter 3. By changing energy density of the excimer laser beam 9, depth of the color filters removable by irradiation of one pulse can be adjusted and one or two of the color filters can be removed by the number of irradiated pulses.

Meanwhile, a buffer layer of about 1 μm in thickness may also be provided between neighboring ones of the piled color filters in order to prevent, when one of the color filters is removed through irradiation of the laser beam, damage to its adjoining color filter. The buffer layer should not have a light absorbing property in a visible light region but should exhibit a light absorbing property in an ultraviolet region having the wavelength of the excimer laser beam. The buffer layer may be obtained by dispersing an ultraviolet absorber in resin. The ultraviolet absorber includes, for example, benzophenone compounds such as 2-hydroxy-4-methoxybenzophenone or benzotriazole compounds such as hydroxyphenyl benzotriazole.

Figure 2D:
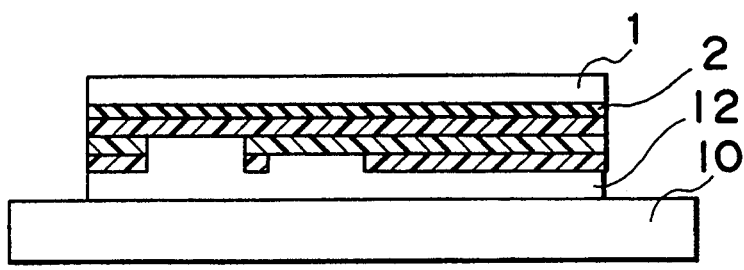
Figure 2E:
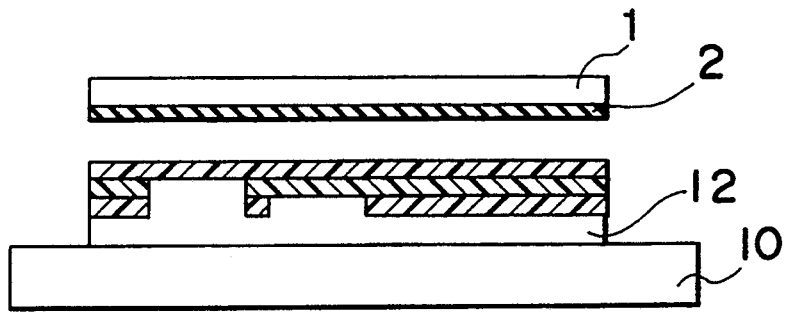

In FIGS. 2(d) and 2(e), the piled color filters are transferred onto the glass substrate 10 through the adhesive layer 12. In this embodiment, ultraviolet-curing epoxy resin is used as the adhesive layer 12. The piled color filters are attached to the glass substrate 10 and the adhesive layer 12 is cured by irradiating an ultraviolet ray thereto. Subsequently, the support member 1 and the peel layer 2 are peeled from the color filters.

Figure 2F:
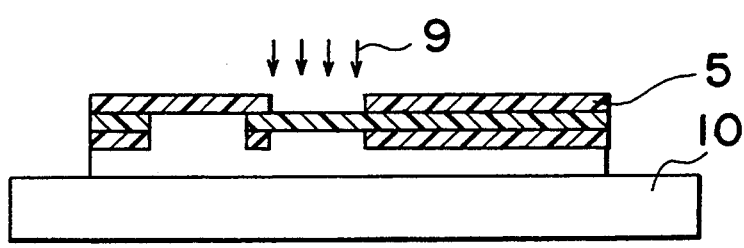
Figure 2G:
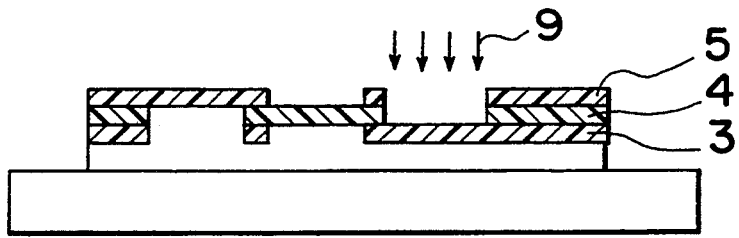

In FIG. 2(f), by irradiating the excimer laser beam 9 to only the blue color filter 5, a pattern is formed on only the blue color filter 5. Meanwhile, in FIG. 2(g), a pattern is formed on the green color filter 4 and the blue color filter 5.

The color filter obtained by the above described steps has portions where the red color filter 3, the green color filter 4 and the blue color filter 5 are piled on one another and other portions which are each occupied by only one of the red color filter 3, the green color filter 4 and the blue color filter 5. In the color filter, since the portions where the color filters are piled on one another function as a black matrix, it is not necessary to form the black matrix additionally.

When the color filter produced by the patterning method according to the second embodiment of the present invention is used for a liquid crystal display, the liquid crystal display has good display quality and the reliability of the color filter is also excellent.

Figure 3A:
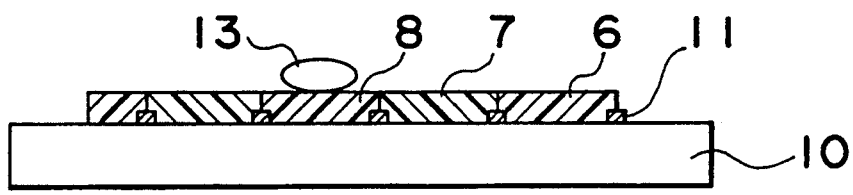
FIGS. 3(*a*) to 3(*g*) are schematic views showing steps of a patterning method according to a third embodiment of the present invention.
Figure 3B:
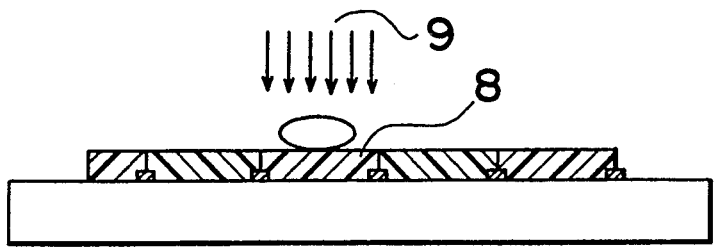
Figure 3C:
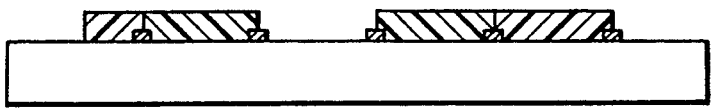

In the course of the steps of production of the color filter, defects such as entry of foreign matter, damage, etc. are generated. FIGS. 3(a) to 3(g) show steps for remedying the defects of the color filter generated in a patterning method according to a third embodiment of the present invention. FIG. 3(a) shows a state in which foreign matter 13 adheres to the produced blue color filter pattern 8. In FIG. 3(b), the excimer laser beam 9 is irradiated to the defective portion so as to obviate the defective portion. An excimer laser is of discharge excitation type using mixed gas of rare gas Xe and halogen gas $Cl_2$ and has an oscillation wavelength of 308 nm. Irradiation of the laser beam is performed by a mask imaging method. When the XeCl excimer laser beam 9 having an energy density of 1.0 $J/cm^2$ per pulse is irradiated to the foreign matter 13, the foreign matter 13 and the corresponding blue color filter pattern 8 can be removed by irradiation of six pulses. FIG. 3(c) shows a state in which the foreign matter 13 and the corresponding blue color filter pattern 8 have been removed.

Figure 3D:
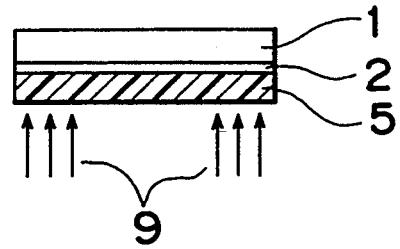
Figure 3E:
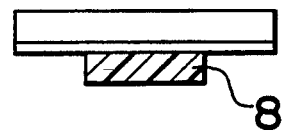
Figure 3F:
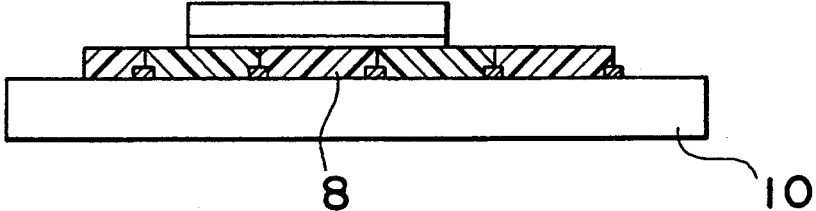
Figure 3G:
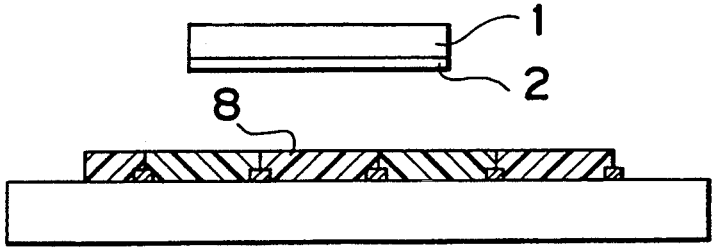

FIGS. 3(d) to 3(g) show steps in which a color filter is newly formed at the removed blue color filter pattern 8. In FIG. 3(d), the peel layer 2 and the blue color filter 5 are formed on the support member 1 and the excimer laser beam 9 is irradiated to the blue color filter 5 so as to form the desired blue color filter pattern 8 on the blue color filter 5. FIG. 3(e) shows the formed blue color filter pattern 8. FIGS. 3(f) and 3(g) show steps in which the blue color filter pattern 8 is transferred onto the glass substrate 10. Initially, as shown in FIG. 3(f), the blue color filter pattern 8 is contact bonded to the glass substrate 10 and then, is heated. Subsequently, as shown in FIG. 3(g), the support member 1 formed by a polyester film is peeled from the glass substrate 10 and thus, the blue color filter pattern 8 has been transferred onto the glass substrate 10.

By the above described steps, the defective color filter can be corrected. When the corrected defective color filter is used for a liquid crystal display, the liquid crystal display has good display quality and the reliability of the color filter is also excellent.

Meanwhile, in this embodiment, the XeCl excimer laser having the oscillation wavelength of 308 nm is employed but a KrF excimer laser having an oscillation wavelength of 248 nm may be likewise effective for obviating the defects or forming the patterns.

Furthermore, in this embodiment, the defect that the foreign matter adheres to the color filter is remedied. However, in this embodiment, it is likewise possible to remedy also such defects as entry of foreign matter into the color filter patterns, pin holes or damage produced in the color filter patterns, etc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A patterning method comprising the steps of:
   irradiating an excimer laser beam to a material layer formed on a peel layer provided on a support member so as to form a pattern on the material layer;
   the material layer being formed by a plurality of layers which are made of different materials, respectively, and are piled on one another;
   transferring onto a substrate through an adhesive layer, the material layer formed with the pattern; and
   irradiating the excimer laser beam to the material layer transferred onto the substrate so as to form a further pattern on the material layer.

2. A patterning method comprising the steps of:
   irradiating an excimer laser beam to a material layer so as to form a pattern on the material layer;
   transferring onto a substrate, the material layer formed with the pattern; and
   irradiating the excimer laser beam to the material layer so as to form a further pattern on the material layer;
   the material layer being formed by a plurality of layers which are made of different materials, respectively, and are piled on one another.

3. A patterning method as claimed in claim 2, wherein the material layer is formed on a peel layer provided on a support member.

4. A patterning method as claimed in claim 2, wherein the material layer is formed on silicone rubber.

5. A patterning method as claimed in claim 2, wherein the material layer formed with the pattern is transferred onto the substrate through an adhesive layer.

6. A patterning method as claimed in claim 2, wherein the material layer formed with the pattern is transferred onto the substrate by thermal contact bonding.

* * * * *